United States Patent [19]

Newlove

[11] 3,761,560

[45] Sept. 25, 1973

[54] FIBRE-GLASS MOULDING PROCESS

[76] Inventor: Brian Newlove, Hillside, Whitwell, Norfolk, England

[22] Filed: Apr. 28, 1971

[21] Appl. No.: 138,190

[30] Foreign Application Priority Data
Apr. 29, 1970  Great Britain.................. 20,638/70

[52] U.S. Cl.................. 264/257, 264/258, 264/328
[51] Int. Cl............................................. B29d 3/02
[58] Field of Search..................... 264/328, DIG. 53, 264/257, 258; 425/812

[56] References Cited
UNITED STATES PATENTS
2,903,388  9/1959  Jonke................................. 264/258

2,847,712  8/1958  Pollard............................ 264/328 X
2,962,764  12/1960  Trojanowski..................... 264/316
2,495,640  1/1950  Muskat........................ 264/DIG. 53

Primary Examiner—Donald J. Arnold
Assistant Examiner—Richard R. Kucia
Attorney—Molinare, Allegretti, Newitt & Witchoff

[57] ABSTRACT

A process for making glass fibre reinforced mouldings, in which the moulding resin is injected into the space between a pair of dies defining between them the shape to be moulded, and in which space is located a glass fibre mat with its edges pinched between the edges of the dies, the opening between the dies at the edges where the mat is so pinched being such as to allow air to escape while providing an impedence to the flow of resin therethrough.

6 Claims, 6 Drawing Figures

PATENTED SEP 25 1973 3,761,560

BRIAN NEWLOVE
Inventor

By Molinare
Allegretti Newitt + Witcoff Attorneys

PATENTED SEP 25 1973 3,761,560

BRIAN NEWLOVE
Inventor

By
Attorneys

FIBRE-GLASS MOULDING PROCESS

This invention relates to a process for glass fibre reinforced mouldings and to mouldings made therefrom.

The most common glass fibre moulding process comprises a so-called hand laying up method wherein a mat of glass fibre is laid over a shaped die and the resin for binding the fibres is worked into the fibres of the mat by brushing or rolling. Such a process is time consuming and requires skilled labour. Another method of moulding more recently developed is the so-called "cold press moulding," wherein a mat of glass fibre, usually of long fibres, together with a resin are compressed between two heavy dies. The dies have to be forced together at a slow rate in order to ensure that the resin penetrates through the mat. A draw-back in such a process however is that there is a likelihood of air being trapped between the dies with a consequent blemish or pocket being formed in the required moulding. Further the apparatus by its very nature is heavy, cumbersome, complicated, expensive and in any case the equipment involved is tied up for a considerable time while the resins are curing.

The present invention aims to overcome the drawbacks of processes used hitherto by providing a process which is less time consuming, requires less complicated and expensive apparatus and is more effective in preventing blemishes.

To this end according to the invention the moulding resin is injected into the space between a pair of dies defining between them the shape to be moulded, in which space is located a glass fibre mat with its edges pinched between the edges of the dies, the opening between the dies at the edges where the mat is so pinched being such as to allow air to escape while providing an impedance to the flow of resin therethrough.

It is not possible to be too specific in connection with the die spacing at the pinch-off but it is believed that it is important to control the air flow therethrough in addition impeding the resin flow. As a practical matter I have found that a pinch-off of 0.005–0.007 ins. per ounce weight/sq.ft. of glass fibre reinforcement employed in the mould leads to the production of a successful moulding.

Preferably the glass fibres of the mat are of the long continuous type although it is believed that the process can be applied with the short glass fibres which are quite commonly employed in the glass fibre moulding industry or with other forms of glass fibre such as the conventional needle-mat. What is important is that the mould cavity is substantially filled with glass fibre.

Because the injection pressure can be relatively small (i.e., generally around 50 lbs./sq.ins) the dies can be of a relatively light construction provided of course that they are sufficiently rigid to avoid distortion and thus the heavy cost of the dies and equipment associated with cold pressure moulding is avoided. In practice of the invention, dies of glass fibre moulded materials have been found convenient.

The process of the invention lends itself readily to mass production methods. Thus, for example, a series of dies can be set up and the injection equipment moved from die to die, injection being carried out at dies along the line while curing is taking place in dies which have been previously injected.

A very important consequence of the invention is the considerable time saving which is achieved over hand laying-up and cold pressure moulding. We have found from experience in moulding one particular article that whereas the pressing in the cold pressure moulding technique took of the order of 20 minutes the moulding by the injection method of the invention took of the order of 2 to 3 minutes. Another example is a moulding which was formerly hand laminatted and taking 1hr 10 minutes being injected in 11 sec.

As to the nature of the resins employed it is believed that the polyester resins which are commonly employed in glass fibre moulding techniques are very suitable in the process of the invention.

The invention will be further described by way of example with reference to the accompanying drawings in which.

Figure 1:
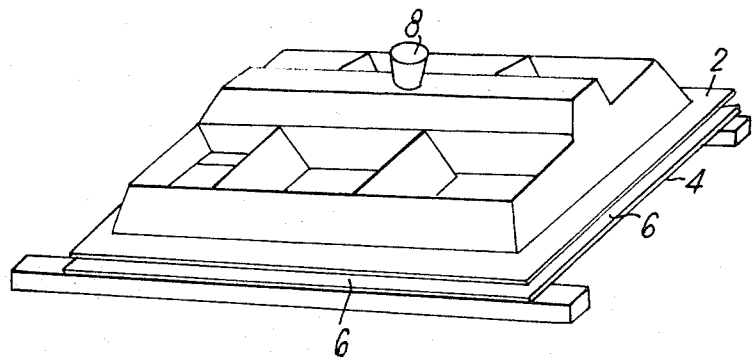
FIGS. 1 is a perspective view of a pair of dies which may be used in carrying out the present invention.
Figure 2:
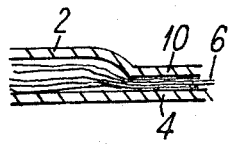
FIG. 2 is a section through the two dies taken at the edge.

Referring to the drawings, in FIG. 1 is shown in perspective a pair of dies suitable for moulding for example a feeding trough. The dies 2 and 4 are complementary and define between them the shape to be moulded (i.e., the moulding cavity). In practice the two dies will be clamped together so as to leave a pinch-off space 6 through which air can escape when the resin is fed in to the die space through the inlet or injection socket 8. When assembled as shown in FIG. 1 the fibre mat will be arranged inside the moulding cavity and will project to the edges and into the pinch-off 6 and as will be seen from FIG. 2 the fibres are pressed together at the pinch-off 6.

Referring again to FIG. 2 the outer periphery 10 of the mould 2 is brought closer to the surface of the die 4 so as to squeeze the fibres but not sufficiently to prevent air escaping through the pinch-off 6. The closing up of the two dies together with the fibres trapped in the narrow opening forms an impedence preventing the waste or resin after injection has ceased. In practice the operator injects the resin into the opening 8 and observes when the resin starts to escape through the opening 6. When the resin appears to have filled the whole of the opening, injection is terminated whereupon further escape is prevented by the impedence.

Figure 3:
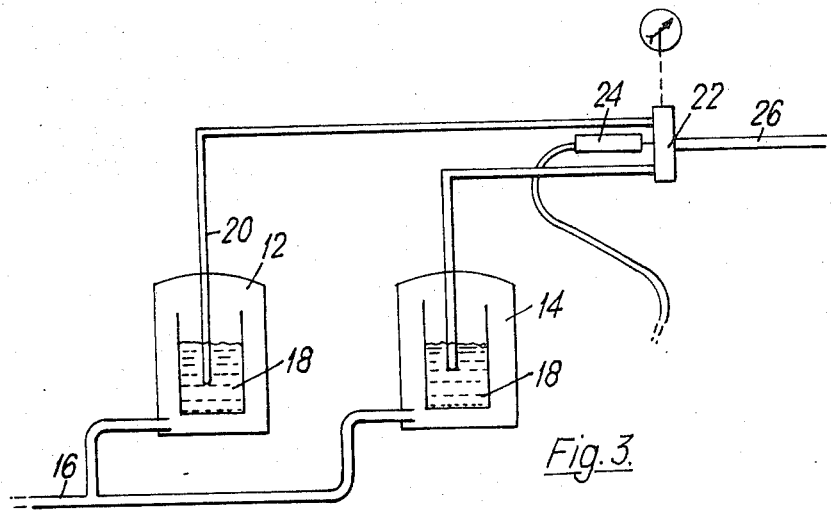
FIG. 3 is a diagram of a typical apparatus for injecting the resin.

The apparatus as shown in FIG. 3 comprises conventional charging tanks 12 and 14 which are pressurized through air pressure lines 16 whereby the surface of the resin in the inner containers 18 is depressed so as to force resin through the lines 20. The lines 20 converge on a mechanical mixer 22 driven by an air motor 24. The mixer being a purely mechanical device and merely driven by an air motor effects the mixing without introducing air into the resin so that the mixed resin fed from the mixer issues through lines 26 free of air. The line 26 is, when the apparatus is in use, plugged into the feeder 8 of the upper die.

As an alternative to the pressurised tanks pumps may be employed for delivering the resins to the mixer 22, an arrangement comprising two pumps, one for each of the substances to be mixed, obviously being the most suitable.

The nozzle 26 has a morse tapered end for plugging into a complementary morse tapered feeder 8. In general a morse tapered plug is inserted into the feeder 8 after injection.

The pressures required for delivering resin to the mixer will, of course, vary according to the circumstances but in practice we have found that pressures up to 100 lbs. and more generally about 50 lbs. per square inch are adequate for most pusposes.

The whole of the apparatus shown in FIG. 3 can be mounted on a trolley or carriage capable of being easily moved from mould to mould. Thus the apparatus and method of invention are very suitable for line production.

The resins employed in the two tanks are usually thermosetting polyester resins and as is common practice one container will incorporate an accelerator and the other container will contain a catalyst.

Figure 4:
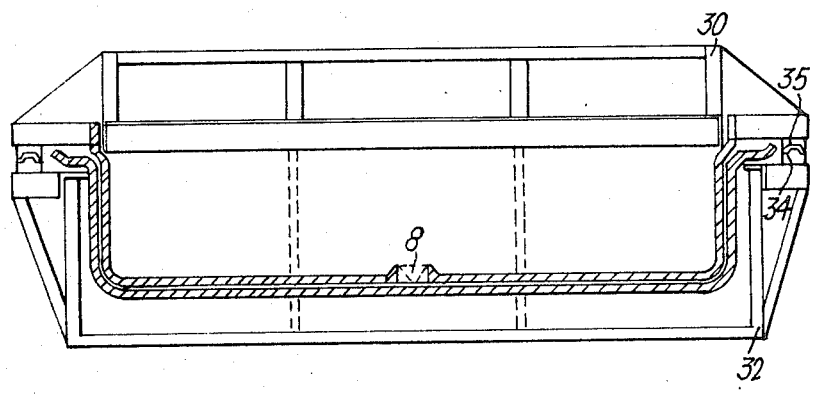
FIG. 4 is a cross-section of a practical embodiment of mould arrangement for use in the present invention.
Figure 5:
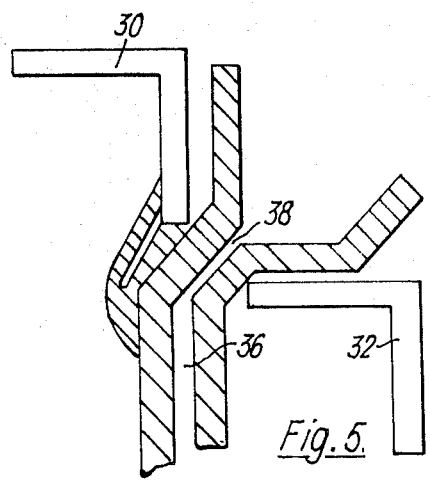
FIG. 5 is an enlargement of a part of the arrangement shown in FIG. 4.

In the arrangement shown in FIG. 4 glass fibre reinforced polyester dies 2 and 4 (which are shown in section) are held in relative positions in steel frames 30,32 which give rigidity to the dies. The frames 30,32 are clamped together during injection and precise relative location of the dies is provided by location dowells 34 on frame 30 which engage in sockets 35. The injection socket 8 is normally centrally situated, this being found to allow greater tolerance at the pinch-off.

The arrangement of FIG. 4 is suitable for mouldings which finish on a vertical edge in which case it is convenient to have the pinch-off 8 extending as shown at 45° to the vertical.

It is an advantage to fit two or three 0.005 inch steel shims under location dowells 34 to provide a degree of adjustment to the pinch-off.

Figure 6:
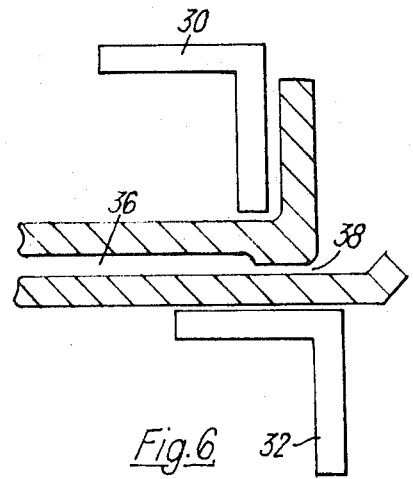
FIG. 6 is an alternative to the arrangement shown in FIG. 6.

The alternative structure of FIG. 6 is suitable in the case where the mouldings finish on a horizontal flange.

One cannot be too specific as to the viscosity of the resin to be employed. In fact it is believed that the process of the invention is operable over a very wide viscosity range provided that there is a large difference between the viscosity of the resin and the air to be expelled. As a practical matter it has been found that the commercially available polyester resins do have a suitable viscosity for carrying out the process.

I claim:

1. A process for molding parts from liquid resin reinforced with glass fibers which comprises:
   providing a mold having a pair of dies, said pair of dies defining between them a cavity corresponding to the shape of said part to be molded and having cooperating spaced flanges around their peripheries;
   placing glass fibers having marginal edges within said cavity, said marginal edges extending between said flanges;
   compressing said marginal edges of said glass fibers between said flanges to a predetermined thickness such that said glass fibers permit the escape of air from said cavity and impede the escape of said liquid resin from said cavity;
   injecting into said cavity under relatively low positive superatmospheric pressure said liquid resin containing a curing agent;
   de-aerating said cavity through said marginal edges of said glass fibers during said injecting step;
   continuing said injecting and de-aerating steps at least until said liquid resin begins to escape through said marginal edges;
   reducing the pressure on said liquid resin to approximately atmospheric;
   curing said liquid resin to a hard, rigid state;
   and removing said molded part from the mold.

2. The process claimed in claim 1 wherein said compressing step includes inserting shims between said pair of dies and clamping said pair of dies together, said shims maintaining said predetermined thickness.

3. The process claimed in claim 1 wherein said predetermined thickness is 0.005 to 0.007 inches per ounce per square foot of said glass fibers used in said process.

4. The process of claim 1 wherein said positive superatmospheric pressure is less than 100 pounds per square inch.

5. The process of claim 1 wherein said liquid resin is a thermosetting polyester resin.

6. The process of claim 1 wherein said glass fibers substantially fill said cavity.

* * * * *